United States Patent
Lee et al.

(10) Patent No.: US 11,595,170 B2
(45) Date of Patent: Feb. 28, 2023

(54) METHOD AND APPARATUS FOR DESIGNING AND OPERATING MULTI-DIMENSIONAL CONSTELLATION

(71) Applicants: Samsung Electronics Co., Ltd., Gyeonggi-do (KR); Industry-Academic Cooperation Foundation Yonsei University, Seoul (KR)

(72) Inventors: Kwonjong Lee, Gyeonggi-do (KR); Hyojin Lee, Gyeonggi-do (KR); Hyungje Lee, Seoul (KR); Chungyong Lee, Seoul (KR); Chahyeon Eom, Seoul (KR); Sanggeun Lee, Seoul (KR)

(73) Assignees: Samsung Electronics Co., Ltd; Industry-Academic Cooperation Foundation, Yonsei University

( * ) Notice: Subject to any disclaimer, the term of this patent is extended or adjusted under 35 U.S.C. 154(b) by 91 days.

(21) Appl. No.: 17/167,689

(22) Filed: Feb. 4, 2021

(65) Prior Publication Data
US 2021/0250143 A1 Aug. 12, 2021

(30) Foreign Application Priority Data
Feb. 7, 2020 (KR) .................. 10-2020-0015031

(51) Int. Cl.
*H04L 5/00* (2006.01)
*H04L 25/03* (2006.01)
*H04W 24/10* (2009.01)

(52) U.S. Cl.
CPC .......... *H04L 5/0048* (2013.01); *H04L 5/0023* (2013.01); *H04L 25/0307* (2013.01); *H04W 24/10* (2013.01)

(58) Field of Classification Search
CPC ............ H04L 25/0254; H04L 25/0307; H04L 25/03165; H04L 27/34; H04L 5/0023; H04L 5/0048; H04W 24/10
See application file for complete search history.

(56) References Cited

U.S. PATENT DOCUMENTS

| | | | |
|---|---|---|---|
| 2005/0068884 A1* | 3/2005 | Yoon ................ | H04L 5/006 370/203 |
| 2009/0060060 A1* | 3/2009 | Stadelmeier ......... | H04L 5/0092 375/257 |

(Continued)

FOREIGN PATENT DOCUMENTS

| KR | 10-1066105 | 9/2011 |
|---|---|---|
| KR | 10-2016-0020542 | 2/2016 |

OTHER PUBLICATIONS

J.—. Porath and T. Aulin, "Design of multidimensional signal constellations," in IEEE Proceedings—Communications, vol. 150, No. 5, pp. 317-, Oct. 14, 2003.

(Continued)

*Primary Examiner* — Mansour Oveissi
(74) *Attorney, Agent, or Firm* — The Farrell Law Firm, P.C.

(57) ABSTRACT

In a 5G communication system or a 6G communication system for supporting higher data rates beyond a 4G communication system such as long term evolution (LTE), a method of a first terminal in a wireless communication system is disclosed and may include performing channel measurement, based on one or more first reference signals received from a base station; identifying channel distribution information between the first terminal and the base station, based on the measured channel; selecting one or more representative channel vectors (RCVs), based on the identified channel distribution information; generating one or more constellations corresponding to the selected one or (Continued)

more RCVs; transmitting constellation set information including the generated one or more constellations to the base station; and performing communication with the base station, based on the generated one or more constellations.

17 Claims, 14 Drawing Sheets

(56) References Cited

U.S. PATENT DOCUMENTS

2010/0247112 A1* 9/2010 Chang .................. H04B 10/116
398/182
2014/0369434 A1 12/2014 Taherzadehboroujeni et al.

OTHER PUBLICATIONS

M. Beko and R. Dinis, "Desigining Good Multi-Dimensional Constallations," in IEEE Wireless Communication Letters, vol. 1, No. 3, pp. 221-224, Jun. 2012.
F. Alberge, "Deep Learning Constellation Design for the AWGN Channel With Additive Radar Interference," in IEEE Transactions on Communications, vol. 67, No. 2, pp. 1413-1423, Feb. 2019.
G.D. Forney and L.-. Wei, "Multidimensional constellations. I. Introduction, figures of merit, and generalized cross constellations," in IEEE Journal on Selected Areas in Communications, vol. 7, No. 6. pp. 877-892, Aug. 1989.
T. O'Shea and J. Hoydis, "An Introduction to Deep Learning for the Physical Layer," in IEEE Transactions on Cognitive Communications and Networking vol. 3, No. 4, 563-575, Dec. 2017.

* cited by examiner

METHOD AND APPARATUS FOR DESIGNING AND OPERATING MULTI-DIMENSIONAL CONSTELLATION

CROSS-REFERENCE TO RELATED APPLICATION(S)

This application is based on and claims priority under 35 U.S.C. § 119 to Korean Patent Application No. 10-2020-0015031, filed on Feb. 7, 2020, in the Korean Intellectual Property Office, the entire disclosure of which is incorporated herein by reference.

BACKGROUND

1. Field

The disclosure generally relates to a method and apparatus for designing and operating a multi-dimensional constellation.

2. Description of Related Art

Considering the development of wireless communication from generation to generation, the technologies that have been developed have mainly been for services targeting humans, such as voice calls, multimedia services, and data services. Following the commercialization of 5G (5th-generation) communication systems, it is expected that the number of connected devices will exponentially grow. Increasingly, these will be connected to communication networks. Examples of connected things may include vehicles, robots, drones, home appliances, displays, smart sensors connected to various infrastructures, construction machines, and factory equipment. Mobile devices are expected to evolve in various forms, such as augmented reality glasses, virtual reality headsets, and hologram devices. In order to provide various services by connecting hundreds of billions of devices and things in the 6G (6th-generation) era, there have been ongoing efforts to develop improved 6G communication systems. For these reasons, 6G communication systems are referred to as beyond-5G systems.

6G communication systems, which are expected to be commercialized around 2030, will have a peak data rate of tera (1,000 giga)-level bps and a radio latency less than 100 μsec, and thus will be 50 times faster than 5G communication systems and have 1/10 the radio latency thereof.

In order to accomplish such a high data rate and an ultra-low latency, it has been considered to implement 6G communication systems in a terahertz band (for example, 95 GHz to bands). It is expected that, due to a more severe path loss and atmospheric absorption in the terahertz bands than those in mmWave bands introduced in 5G, technologies capable of securing the signal transmission distance (that is, coverage) will become more crucial. It is necessary to develop, as major technologies for securing the coverage, radio frequency (RF) elements, antennas, novel waveforms having a better coverage than orthogonal frequency division multiplexing (OFDM), beamforming and massive multiple input multiple output (mMIMO), full dimensional MIMO (FD-MIMO), array antennas, and multi-antenna transmission technologies such as large-scale antennas, in addition, there has been ongoing discussions on new technologies for improving the coverage of terahertz-band signals, such as metamaterial-based lenses and antennas, orbital angular momentum (OAM), and reconfigurable intelligent surface (RIS).

Moreover, in order to improve the spectral efficiency and the overall network performance, the following technologies have been developed for 6G communication systems: a full-duplex technology for enabling an uplink transmission and a downlink transmission to simultaneously use the same frequency resource; a network technology for utilizing satellites, high-altitude platform stations (HAPS), and the like in an integrated manner; an improved network structure for supporting mobile base stations and the like and enabling network operation optimization and automation and the like; a dynamic spectrum sharing technology via collision avoidance based on a prediction of spectrum usage; use of artificial intelligence (AI) in wireless communication for improvement of overall network operation by utilizing AI from a designing phase for developing 6G and internalizing end-to-end AI support functions; and a next-generation distributed computing technology for overcoming the limit of UE computing ability through reachable super-high-performance communication and computing resources (such as mobile edge computing (MEC), clouds, and the like) over the network. In addition, through designing new protocols to be used in 6G communication systems, developing mechanisms for implementing a hardware-based security environment and safe use of data, and developing technologies for maintaining privacy, attempts to strengthen the connectivity between devices, optimize the network, promote software development of network entities, and increase the openness of wireless communications are continuing.

It is expected that research and development of 6G communication systems in hyper-connectivity, including person to mac line (P2M) as well as mac line to machine (M2M), will allow the next hyper-connected experience. Particularly, it is expected that services such as truly immersive extended reality (XR), high-fidelity mobile hologram, and digital replica could be provided through 6G communication systems. In addition, services such as remote surgery for security and reliability enhancement, industrial automation, and emergency response will be provided through the 6G communication system such that the technologies could be applied in various fields, such as industry, medical care, automobiles, and home appliances.

Meanwhile, a constellation that geometrically expresses transmission/reception signals corresponding to various modulation schemes is currently utilized. However, in designing such a constellation, a channel environment between a transmitter and a receiver is not currently considered. Accordingly, there is a need for a technique to improve this drawback.

SUMMARY

An aspect of the disclosure provides an algorithm for designing and operating a multi-dimensional constellation set optimized for a specific channel by using an autoencoder, which is a kind of deep neural network (DNN).

Another aspect of the disclosure provides an algorithm that enables an active operation of the constellation by defining and utilizing a user feature based on the learned constellation.

According to an embodiment of the disclosure, a method of a first terminal in a wireless communication system includes performing channel measurement, based on one or more first reference signals received from a base station; identifying channel distribution information between the first terminal and the base station, based on the measured channel; selecting one or more representative channel vectors (RCVs), based on the identified channel distribution information; generating one or more constellations corresponding to the selected one or more RCVs; transmitting constellation set information including the generated one or more constellations to the base station; and performing communication with the base station, based on the generated one or more constellations.

According to an embodiment of the disclosure, a method of a second terminal in a wireless communication system includes performing channel measurement, based on one or more first reference signals received from a base station; identifying channel distribution information between the second terminal and the base station, based on the measured channel; transmitting user feature information related to the channel distribution information to the base station; receiving, from the base station, one or more constellations determined based on the user feature information; and performing communication with the base station, based on the received one or more constellations.

According to an embodiment of the disclosure, a method of a base station in a wireless communication system includes receiving constellation set information including one or more constellations from a first terminal; transmitting a reference signal for channel measurement to the first terminal; receiving a constellation index (CI) indicating a constellation to be used for communication from the first terminal; selecting a constellation corresponding to the CI from among the one or more constellations; and performing communication with the first terminal, based on the selected constellation.

BRIEF DESCRIPTION OF THE DRAWINGS

The above and other aspects, features and advantages of certain embodiments of the disclosure will be more apparent from the following detailed description, taken in conjunction with the accompanying drawings, in which.

DETAILED DESCRIPTION

Figure 1:
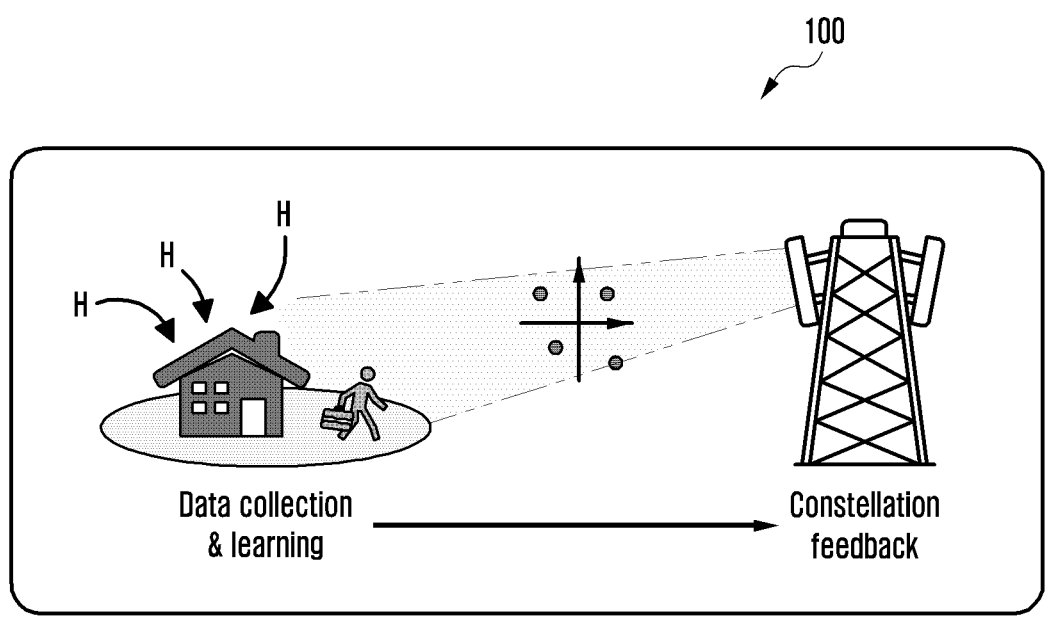
FIG. 1 is a diagram schematically illustrating a design of a constellation in consideration of a channel environment, and communication between a terminal and a base station based on the constellation, according to an embodiment.

Various embodiments of the disclosure will be described in detail with reference to the accompanying drawings. In the following description of embodiments, descriptions of techniques that are well known in the art and not directly related to the disclosure are omitted. This is to clearly convey the subject matter of the disclosure by omitting any unnecessary explanation.

For the same reason, some elements in the drawings are exaggerated, omitted, or schematically illustrated. Also, the size of each element does not entirely reflect the actual size.

The advantages and features of the disclosure and the manner of achieving them will become apparent with reference to embodiments described in detail below and with reference to the accompanying drawings. The disclosure may, however, be embodied in many different forms and should not be construed as being limited to the embodiments set forth herein. Rather, these embodiments are provided so that the disclosure will be thorough and complete and will fully convey the scope of the disclosure to those skilled in the art. To fully disclose the scope of the disclosure to those skilled in the art, the disclosure is only defined by the scope of claims. In the disclosure, similar reference numbers are used to indicate similar constituent elements.

It will be understood that each block of flowchart illustrations, and combinations of blocks in the flowchart illustrations, may be implemented by computer program instructions. These computer program instructions may be provided to a processor of a general purpose computer, special purpose computer, or other programmable data processing apparatus to produce a machine, such that the instructions, which are executed via the processor of the computer or other programmable data processing apparatus, generate means for implementing the functions specified in the flowchart block or blocks. These computer program instructions may also be stored in a computer usable or computer-readable memory that may direct a computer or other programmable data processing apparatus to function in a particular manner, such that the instructions stored in the computer usable or computer-readable memory produce an article of manufacture including instruction means that implement the function specified in the flowchart block or blocks. The computer program instructions may also be loaded onto a computer or other programmable data processing apparatus to cause a series of operational steps to be performed on the computer or other programmable apparatus to produce a computer implemented process such that the instructions that are executed on the computer or other programmable apparatus provide steps for implementing the functions specified in the flowchart block or blocks.

In addition, each block of the flowchart illustrations may represent a module, segment, or portion of code, which comprises one or more executable instructions for implementing the specified logical function(s). It should also be noted that in some alternative implementations, the functions noted in the blocks may occur out of order. For example, two blocks shown in succession may in fact be executed substantially concurrently or the blocks may sometimes be executed in the reverse order, depending upon the functionality involved.

The term "unit", as used herein, refers to a software or hardware component or device, such as a field programmable gate array (FPGA) or application specific integrated circuit (ASIC), which performs certain tasks. A unit may be configured to reside on an addressable storage medium and configured to execute on one or more processors. Thus, a module or unit may include, by way of example, components, such as software components, object-oriented software components, class components and task components, processes, functions, attributes, procedures, subroutines, segments of program code, drivers, firmware, microcode, circuitry, data, databases, data structures, tables, arrays, and variables. The functionality provided for in the components and units may be combined into fewer components and units or further separated into additional components and modules. In addition, the components and units may be implemented to operate one or more central processing units (CPUs) in a device or a secure multimedia card. Also, in embodiments, the unit may include one or more processors.

In the following description, a term referring to a signal, a term referring to a channel, a term referring to control information, a term referring to a network entity, a term referring to a component of an apparatus, a term for identifying a connection node, terms referring to messages, a term referring to an interface between network objects, terms referring to various kinds of identification information, and the like are used for convenience of description. Thus, the disclosure is not limited to such terms used herein, and any other term having an equivalent technical meaning may be used.

In a wireless communication system, signals to be transmitted are modulated into digital signals according to various modulation schemes, and a set of such digital signals may be mapped to and represented on a geometric signal space. In the disclosure, this is referred to as a constellation. For example, digital signals obtained through modulation schemes such as binary phase shift key (BPSK), quadrature phase shift key (QPSK), quadrature amplitude modulation (16-QAM), and the like may be mapped to and expressed on an I-Q two-dimensional complex plane having an I (In-phase) component and a Q (quadrature) component as axes. However, the above modulation schemes are only examples and are not to be construed as a limitation. Methods for designing and operating a constellation to be described in the disclosure may be applied to any modulation scheme used in a wireless communication system including BPSK, QPSK, 16-QAM, 64-QAM, 256-QAM, 1024-QAM, 4096-QAM, and the like.

According to the disclosure, a constellation optimized for a specific channel can be designed and operated, so that the reliability of a communication system can be improved. In addition, using a user feature of a terminal having learned a constellation, even another terminal having not learned a constellation depending on a channel environment can perform communication based on the learned constellation.

FIG. 1 is a diagram 100 schematically illustrating a design of a constellation in consideration of a channel environment, and communication between a terminal and a base station based on the constellation, according to an embodiment.

A method of increasing the reliability of wireless communication through the design and operation of a multi-dimensional constellation optimized for a channel environment is disclosed. Specifically, the disclosure provides a learning phase for learning or designing a constellation, and a data transmission phase for operating the learned or designed constellation. In addition, the disclosure describes a method of supporting, by using a user feature corresponding to a constellation learned or designed by a terminal, communication using a multi-dimensional constellation to another terminal that has not learned the constellation.

In an embodiment, a learning phase for learning and designing a constellation depending on a channel environment is described. In the disclosure, the learning phase may include a process for a terminal to learn and design a multi-dimensional constellation before operating the constellation, and then to share the designed constellation with a base station.

Figure 2:
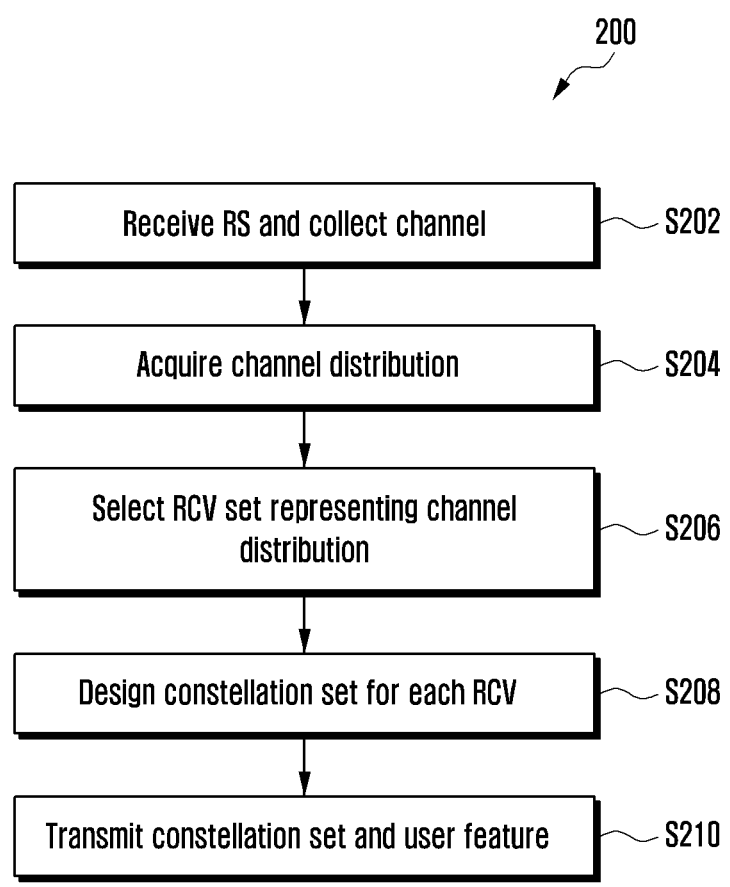
FIG. 2 is a flowchart illustrating operations of a terminal in a learning phase, according to an embodiment.

FIG. 2 is a flowchart 200 illustrating operations of a terminal (also referred to as user equipment (UE)) in a learning phase, according to an embodiment.

Referring to FIG. 2, at step S202, the terminal may receive a reference signal (RS) from a base station and perform channel state measurement based on the RS. The terminal may periodically or aperiodically receive a plurality of RSs from the base station and, based on the respective RSs, acquire a plurality of channel states between the terminal and the base station. The signals received from the base station for channel state measurement may include any RS such as, for example, a cell-specific reference signal (CRS), a channel state information reference signal (CSI-RS), or a demodulation reference signal (DMRS).

At step S204, the terminal may identify a channel distribution, based on the channel states acquired through the step S202. The channel distribution is information for identifying the frequency (or probability) of occurrence of each channel state that may exist between the terminal and the base station. The channel distribution may mean an arbitrary type of arrangement or expression indicating the distribution of one or more channel states acquired by the terminal using the RSs received from the base station. The terminal may identify the channel distribution in consideration of a recent channel having a high correlation with a current channel state.

Figure 3:
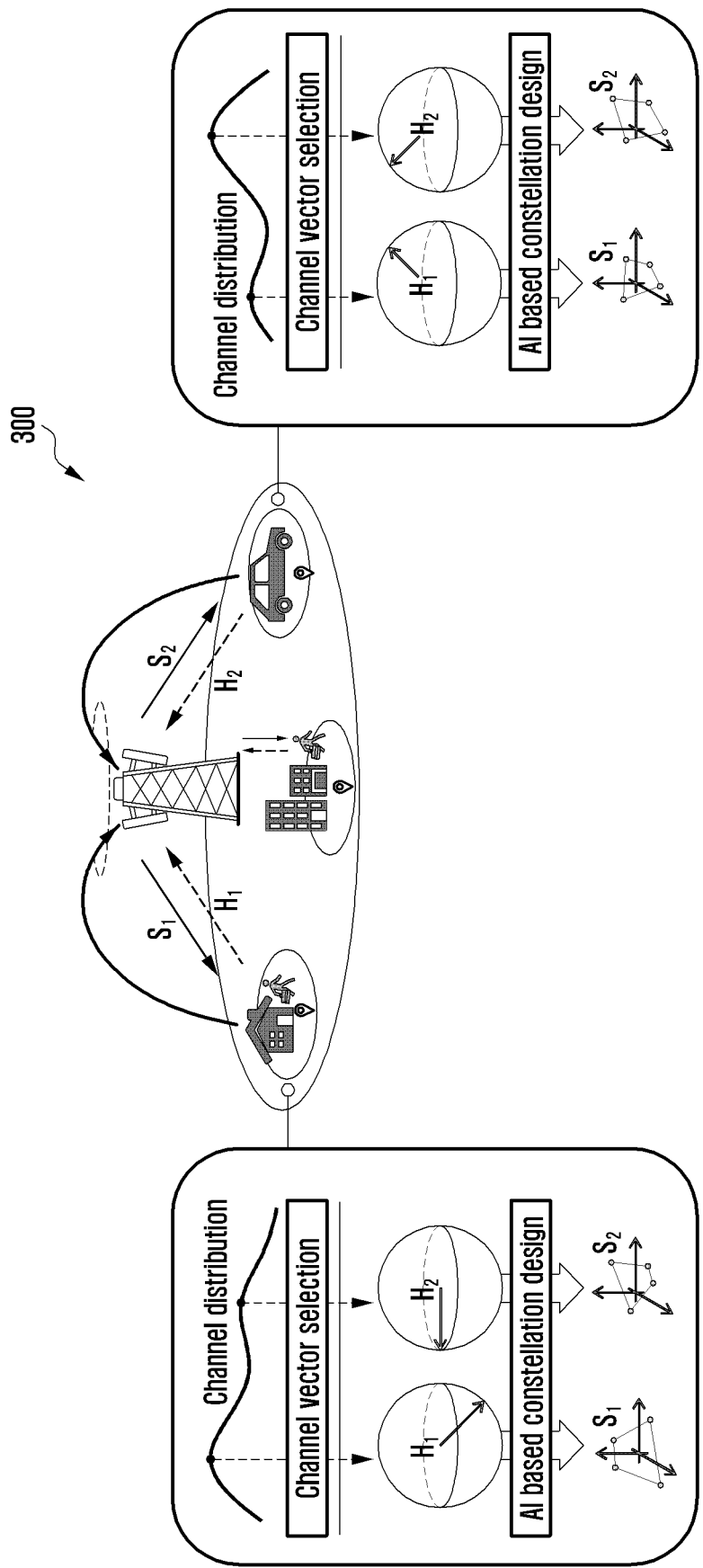
FIG. 3 is a diagram schematically illustrating setting of a representative channel vector (RCV) using a channel distribution and a constellation design based on the RCV, according to an embodiment.

FIG. 3 is a diagram 300 schematically illustrating setting of a representative channel vector (RCV) using a channel distribution and a constellation design based on the RCV, according to an embodiment.

As described above, channel distribution may mean an arbitrary type of arrangement or expression indicating the distribution of one or more channel states acquired by the terminal using the RSs received from the base station. FIG. 3 shows a graph that represents a channel state acquisition frequency, i.e., a channel state occurrence probability (a vertical axis) according to each channel state (a horizontal axis), but this is only an example and does not limit the scope of the disclosure. In the illustrated example of FIG. 3, the larger the value of a channel distribution graph (that is, the higher the height on the vertical axis), the higher the occurrence probability of a corresponding channel state.

Returning to FIG. 2, at step S206, the terminal may select a representative channel vector (RCV) set based on the occurrence probability of a channel by using the identified channel distribution.

According to an embodiment, the RCV may refer to a vector representing a channel distribution identified by the terminal, that is, a vector corresponding to a channel state in which the occurrence probability of a channel is high. In FIG. 3, 'H1' and 'H2' denote examples of RCV. The RCV set may indicate a set of RCV s. A rule for the terminal to select the RCV or RCV set may be defined variously. For example, the terminal may select the RCV set by selecting a channel having a channel occurrence probability greater than or equal to a predetermined threshold, based on the identified channel distribution, or by selecting N channels in the identified channel distribution in the order of higher channel occurrence probabilities.

At step S208, the terminal may design a constellation set optimized for each RCV included in the RCV set, based on the selected RCV set. In an embodiment, the design of a constellation set may be performed based on an autoencoder, which is a kind of deep neural network (DNN). The autoencoder is a neural network (NN) that learns to copy its input to its output, and may be composed of an input layer (or encoder), an output layer (or decoder), and one or more hidden layers. One autoencoder NN architecture may be defined through the number of layers, the number of nodes per layer, and weights between nodes. If the learning of the autoencoder is performed by matching the input to a transmitter and the output to a receiver, respectively, based on the feature of the autoencoder that the input and the output are the same, joint optimization between the transmitter and the receiver is possible. Each of the transmitter and the receiver may be either a base station or a terminal. For example, in case of downlink communication, the transmitter may be a base station, and the receiver may be a terminal. In case of uplink communication, the transmitter may be a terminal, and the receiver may be a base station. In case of sidelink communication, the transmitter may be a terminal, and the receiver may be another terminal.

The learning of the autoencoder may be performed by reflecting a hidden layer considering a channel state (H). Through this, it is possible to learn an autoencoder architecture in which a transmission signal of a transmitter and a reception signal of a receiver are the same under a specific channel environment (H). The terminal can acquire a constellation optimized for a channel environment, based on the hidden layer of the autoencoder learned in consideration of a channel state (H). In addition, the terminal can acquire a multi-dimensional constellation by appropriately adjusting the dimension of the hidden layer for the learning of the autoencoder.

In addition to a cross-entropy cost function generally used for the learning of the autoencoder modeling a communication system, a new cost function that includes a minimum distance between noise-free received signals is disclosed to design a constellation set optimized for a channel.

First, a pairwise error probability (PEP) corresponding to symbols $S_i$ and $S_j$ may be defined as shown in Equation (1) below.

$$P(S_i \rightarrow S_j | H) = Q\left(\sqrt{\frac{E_s \|H(S_i - S_j)\|_F^2}{2M_r N_0}}\right) \quad (1)$$

In Equation (1), $P(S_i \rightarrow S_j | H)$ denotes a probability that a signal corresponding to a symbol $S_i$ is erroneously recognized as a signal corresponding to a symbol $S_j$ under a channel H (that is, a probability that the signal corresponding to $S_i$ transmitted by a transmitter is received by a receiver while being recognized as a signal corresponding to $S_j$), and $H(S_i - S_j)$ denotes a distance between symbols $S_i$ and $S_j$ on a constellation according to a channel H. As shown in Equation (1), the greater the geometrical distance $H(S_i - S_j)$ on the constellation, the smaller the probability $P(S_i \rightarrow S_j | H)$ of misrecognition, and the smaller the distance, the greater the probability of misrecognition. It is desirable that a constellation is designed to minimize the value of average PEP (APEP) representing the average of PEPs between all symbols. The disclosure describes a method of learning a hidden layer of an autoencoder such that a minimum distance among distances between respective symbols on a constellation is maximized. To this end, a cost function for learning of an autoencoder disclosed herein is as shown in Equation (2) below.

$$L(s, \hat{s}, H, y_k) = \alpha \cdot CE(s, \hat{s}) + \beta \cdot f(\min\|y_i - y_j\|_F^2) \quad (2)$$

CE: cross—entropy function
s, ŝ: input, output of autoencoder
$y_i$: i—th noise—free received signal
f: monotonically decreasing function
α, β: scaling factor As shown in Equation (2), the disclosure designs a cost function to maximize a distance between two symbols having the closest distance among symbols of the constellation designed corresponding to a channel H and performs the learning of an autoencoder. It is therefore possible to perform the autoencoder learning optimized for a channel environment and, based on this, acquire the constellation.

The design and acquisition of the constellation may be performed for each RCV in the RCV set selected by the terminal at step S204. In addition, the design of the constellation may be performed for various modulation orders for each RCV and thus be appropriately applied depending on the modulation order used in signal transmission and reception. That is, the terminal may design respective constellations corresponding to the selected representative channels for various modulation orders and thereby acquire a constellation set including one or more constellations.

At step S210, the terminal may transmit the acquired constellation set to the base station. At this time, in addition to the acquired constellation set, the terminal may also transmit information related to a user feature, which is the basis of the constellation design, to the base station. The user feature is a user-specific parameter that may affect a channel or channel distribution on which the constellation design is based. For example, the user feature may include a terminal position, a mobility, a line of sight (LOS) condition, an RCV set, and the like. Although FIG. 2 shows that the constellation set and the user feature are transmitted together at step S210, this is only an example. That is, the constellation set and the user feature do not necessarily have to be transmitted at the same time, and each may be independently transmitted as necessary, or the transmission of any one may be omitted.

The transmission of the constellation set and the user feature by the terminal may be triggered at a request of the base station, performed based on a determination of the terminal under a specific condition, or performed by a combination thereof. The specific condition may include, but is not limited to, a case where the performance of a learned autoencoder satisfies a certain condition, a case where the fluctuation of a channel distribution measured by the terminal exceeds a certain condition, a case where a period predetermined by the base station or the terminal elapses, or a case where there is a user's input. The base station may store the constellation set and the user feature received from the terminal. According to an embodiment, the base station may correlate the constellation set and the user feature, received from the terminal, with each other, and may use them for communication with another terminal that has not performed the learning of the constellation set. This will be described in detail through a third embodiment.

Figure 4:
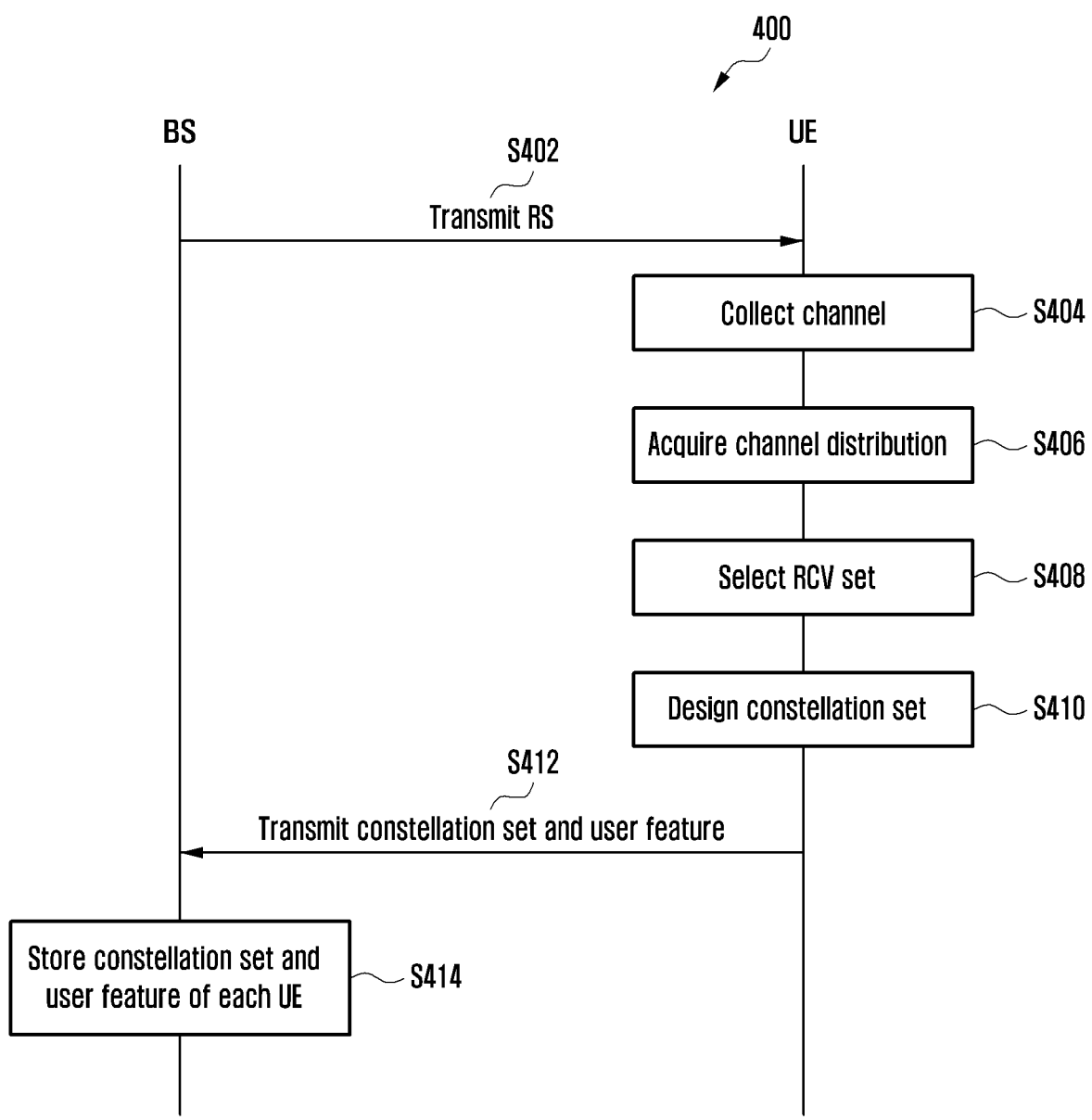
FIG. 4 is a flow diagram illustrating operations of a terminal and a base station in a learning phase; according to an embodiment.

FIG. 4 is a flow diagram 400 illustrating operations of a terminal and a base station in a learning phase, according to an embodiment.

Referring to FIG. 4, a base station (BS) may transmit a reference signal (RS) to a terminal (also referred to as user equipment (UE)) at operation S402, and the terminal may perform channel measurement based on the received RS at operation S404 and thereby acquire a channel distribution at operation S406. The terminal may select a representative channel vector (RCV) set at operation S408 by selecting a channel with a high probability of occurrence based on the acquired channel distribution, and design a constellation set corresponding to each RCV in the RCV set at operation S410 by performing autoencoder learning. The terminal may transmit the acquired constellation set and a user feature to the base station at operation S412, and the base station may store both the constellation set and the user feature received from the terminal at operation S414.

Through the learning phase described in a first embodiment described above, a constellation set optimized for a channel environment between the terminal and the base station can be designed and shared by the terminal and the base station. Hereinafter, a method for transmitting and receiving signals between the terminal and the base station by operating the shared constellation set will be described.

In an embodiment, a data transmission phase for transmitting and receiving signals between the base station and the terminal by operating the constellation set designed through the learning phase is described. Although in this embodiment the term "data transmission phase" is used for intuitive description, a signal transmission/reception method according to this embodiment is not necessarily limited to transmission/reception of data, and can be also applied to transmission/reception of any signal such as a control signal between the base station and the terminal.

Figure 5:
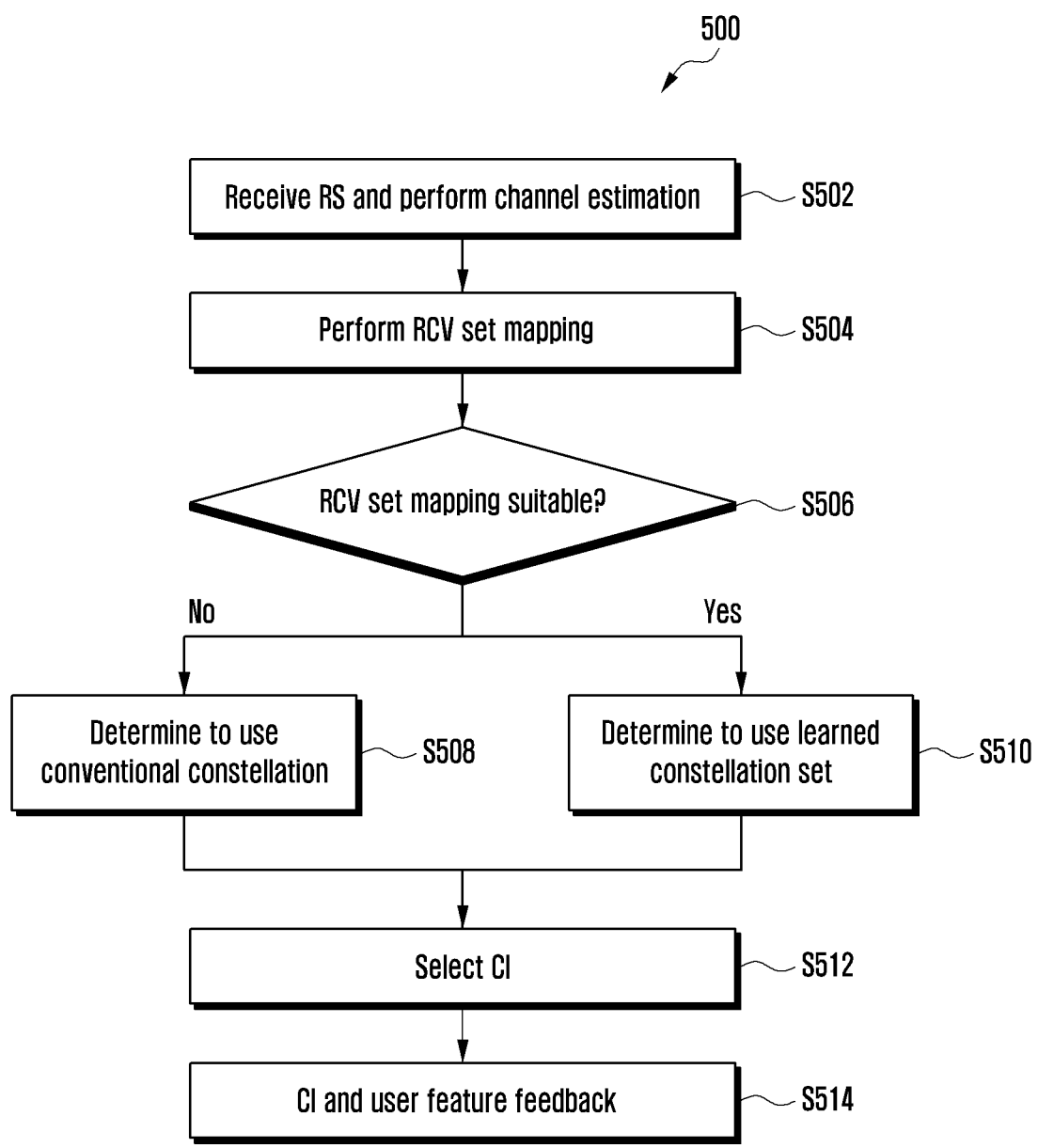
FIG. 5 is a flowchart illustrating operations of a terminal in a data transmission phase, according to an embodiment.

FIG. 5 is a flowchart 500 illustrating operations of a terminal in a data transmission phase, according to an embodiment.

Referring to FIG. 5, at step S502, the terminal may perform channel measurement based on a reference signal (RS) received from a base station. Then, at step S504, the terminal may perform mapping between the currently measured channel and an RCV set having been used to design a constellation set in the learning phase. As described above in the learning phase, the terminal may design the constellation to correspond to each representative channel vector (RCV), and perform mapping with the RCV most similar to a current channel state among RCV's in order to select an appropriate constellation. This operation of RCV set mapping may include a process of calculating a distance between the currently measured channel and each RCV included in the RCV set. This calculation may use any distance metric such as Euclidian distance, chordal distance, or the like. At step S506, the terminal may compare the distance between the currently measured channel and the RCV with a predetermined threshold and thereby determine whether the RCV set mapping is appropriate.

If in the RCV set there is an RCV whose distance from the currently measured channel is less than the threshold, the terminal may determine that there is a channel similar to the current channel state among RCVs used for constellation set design, and may also determine at step S510 that the RCV set mapping is appropriate. In this step, the terminal may select the RCV (i.e., the RCV with the smallest distance) being most similar to the current channel state, and then determine to perform communication using a constellation set designed based on the selected RCV.

On the other hand, if in the RCV set there is no RCV whose distance from the currently measured channel is less than the threshold (that is, when all RCVs have a distance greater than the threshold), the terminal may determine that there is no channel similar to the current channel state among RCVs used for constellation set design, and may also determine at step S508 that the RCV set mapping is not appropriate. In this operation, the terminal may determine to perform communication using a conventional constellation.

At step S512, the terminal may select a constellation index (CI) corresponding to each constellation by determining which constellation is to be used depending on whether the RCV set mapping is appropriate and, if appropriate, which RCV is most similar to the current channel. As shown in Table 1 below, CIs may be stored corresponding to a typically used conventional constellation and respective constellation sets learned by the terminal and transmitted to the base station. The number of CIs may be determined based on the number of RCVs selected by the terminal. The conventional constellation may include, for example, QPSK constellation, QAM constellation, and the like depending on a modulation scheme.

TABLE 1

| Constellation index (CI) | Constellation |
| --- | --- |
| CI 0 | Conventional constellation |
| CI 1 | Constellation designed based on RCV #0 |
| CI 2 | Constellation designed based on RCV #1 |
| ... | ... |

At step S514, the terminal may transmit the selected CI and the user feature for specifying the terminal to the base station such that the base station can perform communication with the terminal based on the constellation selected by the terminal. Although FIG. 5 shows that the CI and the user feature are transmitted together at the step S514, this is an example only. That is, the CI and the user feature do not necessarily have to be transmitted at the same time, and each may be independently transmitted as necessary, or the transmission of any one may be omitted. The CI and the user feature may be transmitted to the base station through any uplink channel such as PUCCH and PUSCH.

Figure 6:
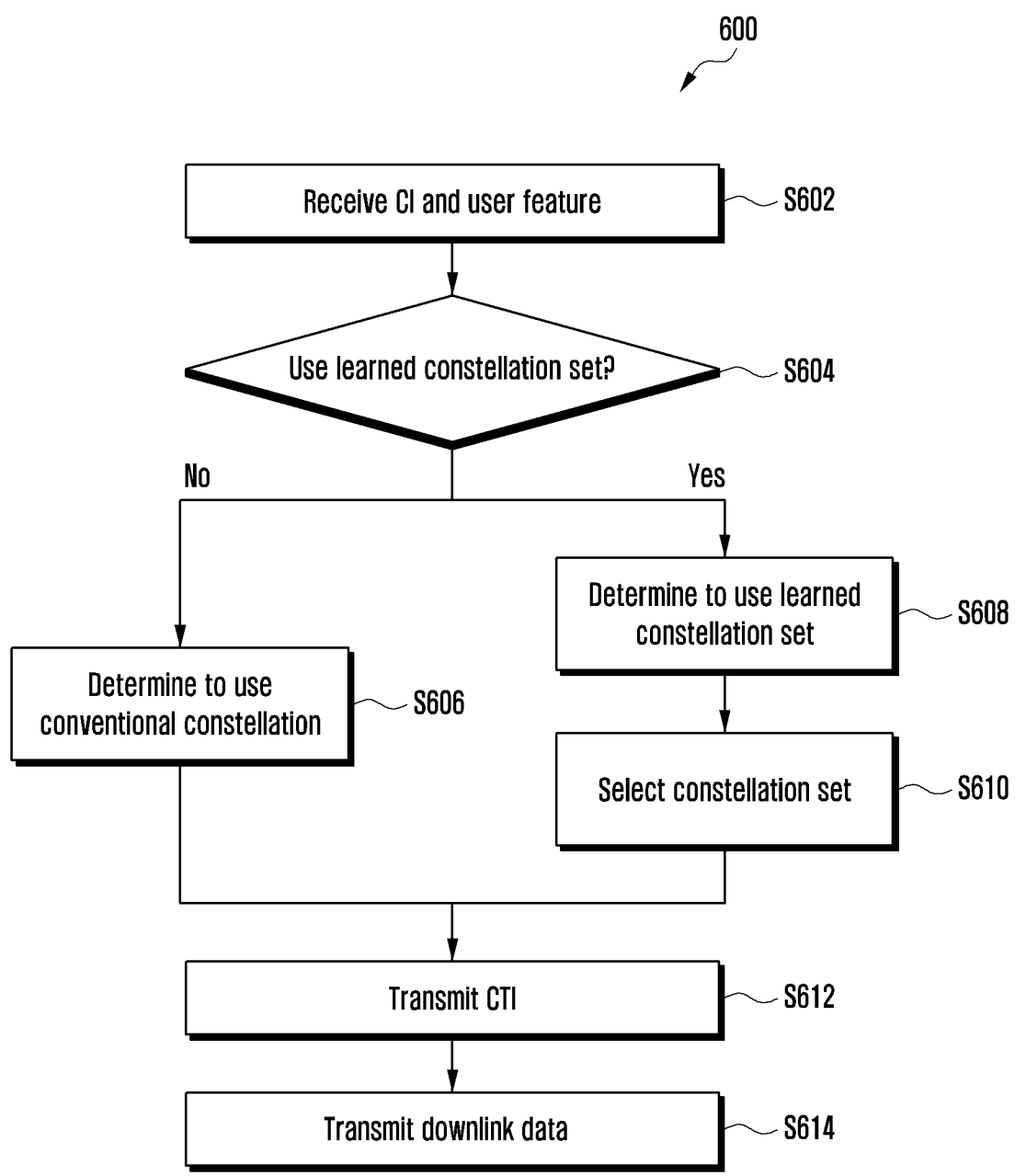
FIG. 6 is a flowchart illustrating operations of a base station in a data transmission phase, according to an embodiment.

FIG. 6 is a flowchart 600 illustrating operations of a base station in a data transmission phase, according to an embodiment.

Referring to FIG. 6, at step S602, the base station may receive a CI and a user feature from a terminal. Then, at step S604, the base station may determine whether to use a constellation set learned by the terminal, based on the CI and the user feature received from the terminal, If the CI received from the terminal indicates the use of a conventional constellation, the base station may determine at step S606 that the constellation set designed by the terminal is not used and instead the conventional constellation is used. Otherwise, if the CI indicates the use of any one in the constellation set designed by the terminal, the base station may determine, at step S608, to use the constellation set designed by the terminal and then select, at step S610, the constellation indicated by the CI.

The base station may transmit, at step S612, to the terminal a constellation type index (CTI) indicating whether to use the constellation designed by the terminal, and may transmit, at step S614, a downlink data signal based on the selected constellation. That is, the base station may transmit the CTI as information for notifying the terminal whether to transmit a signal by actually using the constellation requested by the terminal through the CI. For example, the CTI may be expressed as 1 bit and transmitted through any downlink channel such as PDCCH or PDSCH, preferably PDCCH.

Figure 7:
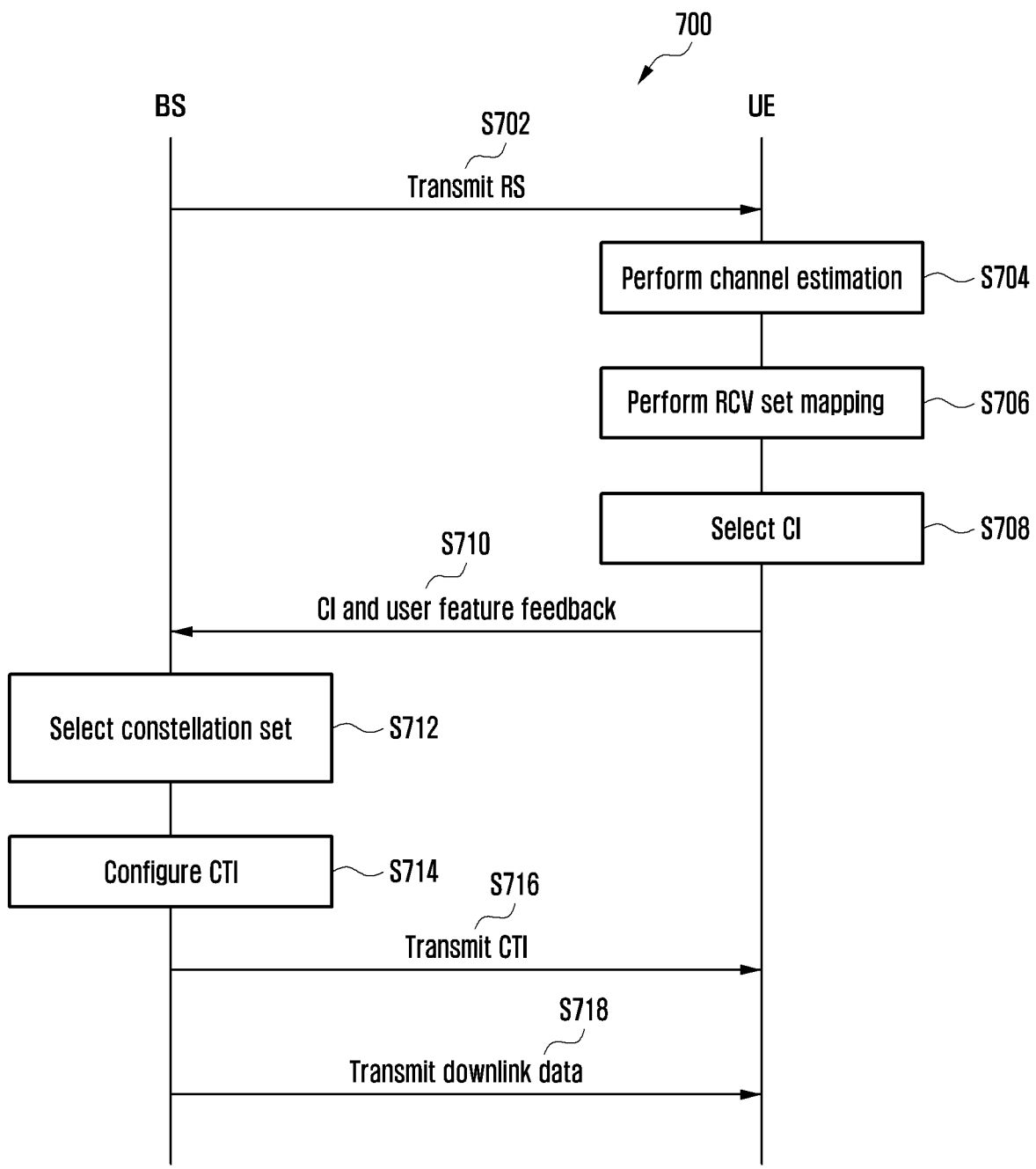
FIG. 7 is a flow diagram illustrating operations of a terminal and a base station in a data transmission phase, according to an embodiment.

FIG. 7 is a flow diagram 700 illustrating operations of a terminal and a base station in a data transmission phase, according to an embodiment.

Referring to FIG. 7, the base station (BS) may transmit a reference signal (RS) to the terminal (UE) at operation S702, and the terminal may perform channel measurement for a current channel by using the RS received from the BS at operation S704. The terminal may perform mapping with an RCV set selected in the learning phase, based on the channel measurement result, at operation S706, and may select a CI at operation S708 by determining which constellation is to be used depending on determining whether the RCV set mapping is appropriate and, if appropriate, which RCV is most similar to the current channel. The terminal may transmit the selected CI and a user feature to the base station at operation S710. Then, the base station may select, at operation S712, a constellation set to be used for signal transmission, based on the CI and the user feature received from the terminal, and may configure, at operation S714, a CTI indicating whether to use the constellation designed by the terminal. Thereafter, the base station may transmit the cm and downlink data to the terminal at operations S716 and S718, and the terminal may receive a signal from the base station based on an appropriate constellation.

Meanwhile, in a process of operating the constellation according to the above-described embodiment, a channel state between the terminal and the base station may change, and thus the constellation set designed by the terminal and shared with the base station may no longer be valid. In this case, the base station or the terminal may perform redesign or correction for the constellation set currently shared. A condition for determining that the constellation set is no longer valid may be, for example, a condition in Which the terminal reports continuously, or within a certain interval, CI 0 more than a predetermined number of times (i.e., maximum QRN: maximum QAM requesting number). Herein, CI 0 denotes a CI instructing to use a conventional constellation, not a constellation set designed by the terminal, as shown in Table 1. That is, if the terminal continuously transmits CI 0 for a certain time upon determining that RCV mapping is not appropriate, the base station and the terminal may determine that an RCV set used at the time of designing a constellation set is not suitable for a current channel, and may also determine that redesign or correction is necessary.

When the base station or the terminal determines that the current constellation set is not valid, the terminal may perform the learning phase again and thereby design a new constellation set based on the current channel state and channel distribution. To this end, the terminal may inform the base station through an uplink channel that a constellation set redesign is to be performed, or the base station may request the terminal to perform a constellation set redesign through a downlink channel. Then, while the terminal per- forms a new constellation set design, the terminal and the base station may transmit and receive signals by using a conventional constellation corresponding to CI 0. A process of designing a new constellation set is similar to that described in the first embodiment described above, so that a detailed description thereof will be omitted.

According to another embodiment, when the base station or the terminal determines that the current constellation set is not valid, the base station may correct the constellation set and inform the terminal of this situation.

Figure 8:
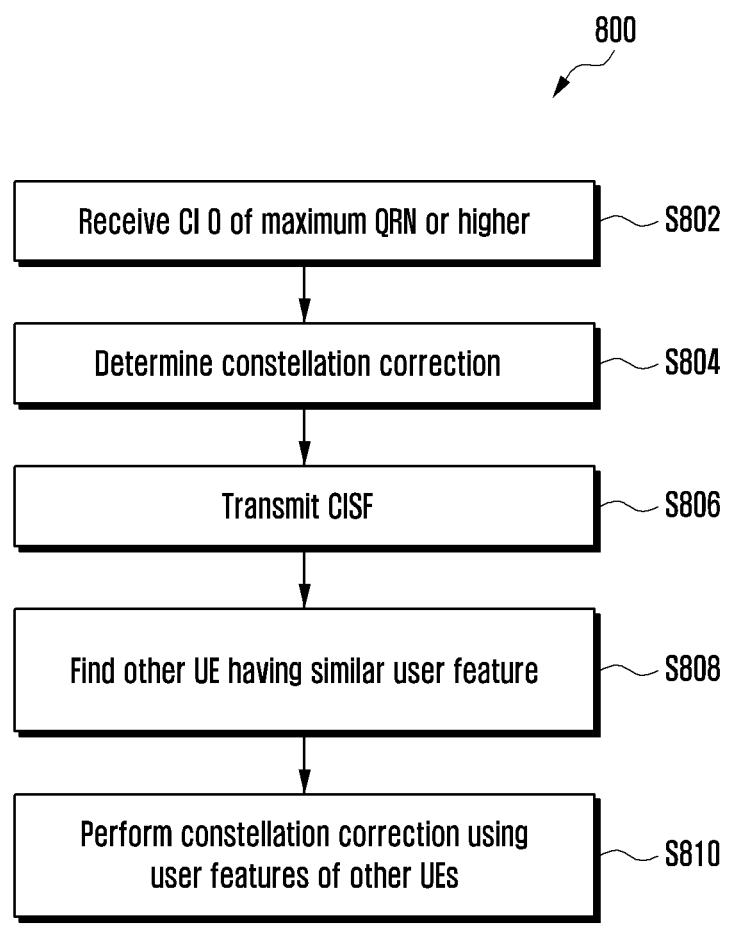
FIG. 8 is a flowchart illustrating operations of a base station when the base station corrects a constellation set, according to an embodiment.
Figure 9:
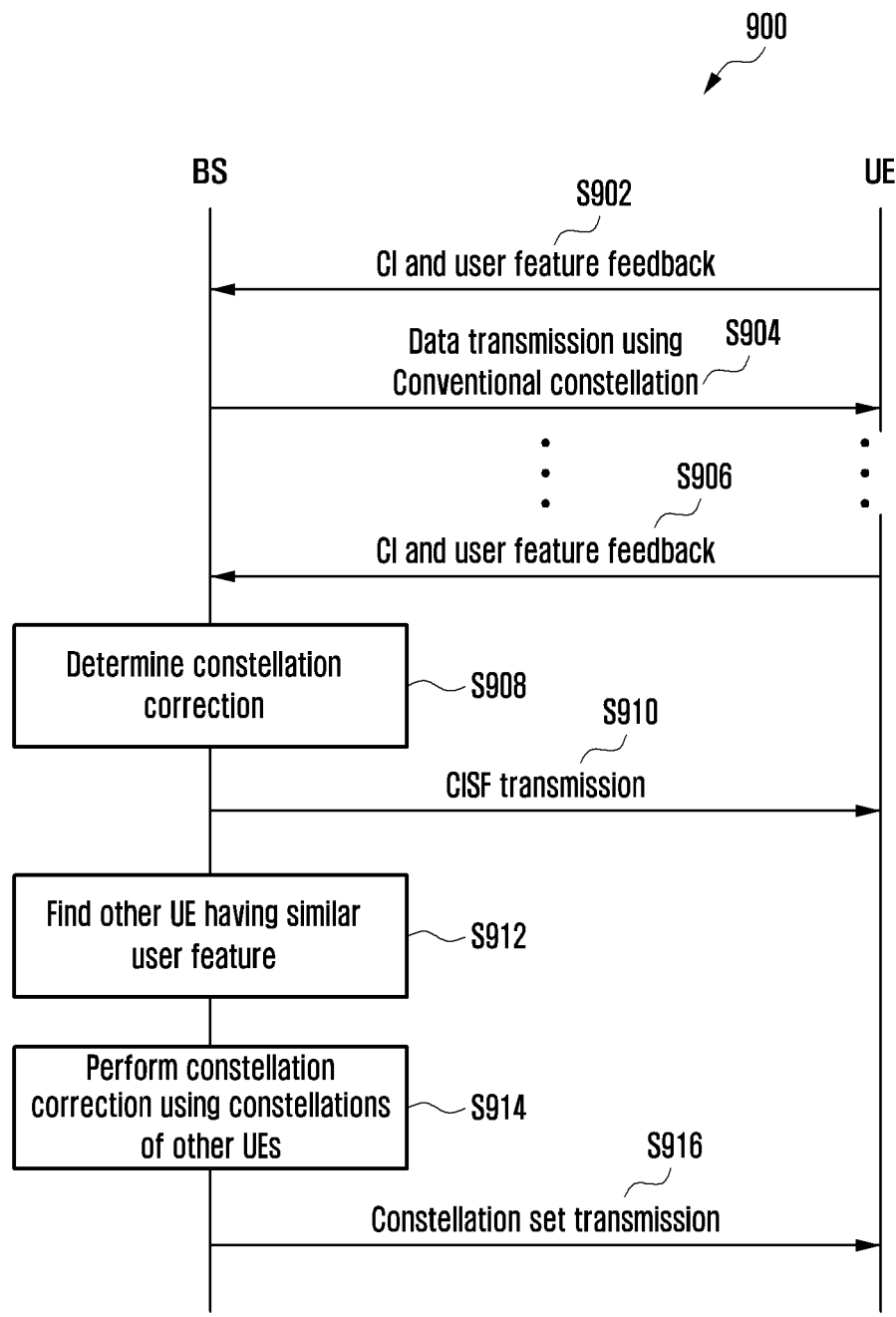
FIG. 9 is a flow diagram illustrating operations of a terminal and a base station when the base station corrects a constellation set, according to an embodiment.

FIG. 8 is a flowchart 800 illustrating operations of a base station when the base station corrects a constellation set, according to an embodiment. FIG. 9 is a flow diagram 900 illustrating operations of a terminal and a base station when the base station corrects a constellation set, according to an embodiment.

Referring to FIGS. 8 and 9, when the base station (BS) receives continuously, or within a certain interval, CI 0 of the maximum QRN or higher from the terminal at step S802 or operations S902 to S906, the base station may determine at step S804 or operation S908 that the correction of a constellation set is needed. Then, at step S806 or operation. S910, the base station may transmit a constellation index stop flag (CISF) to the terminal through a downlink channel to inform that the base station will perform the correction of the constellation set. Thereafter, the base station may search for other terminal having a user feature similar to that reported by the terminal at step S808 or operation S912, and then perform the correction of the constellation set by using a constellation set of found other terminal at step S810 or operation S914. The corrected constellation set may be transmitted to the terminal through a downlink channel at operation S916, and the base station and the terminal may perform the data transmission phase described in the second embodiment, based on the corrected constellation set.

In an embodiment, a method for supporting, by using a constellation set designed by other terminal, the data transmission phase according to the embodiment described above to a terminal, which has not performed a learning phase, will be described.

Figure 10:
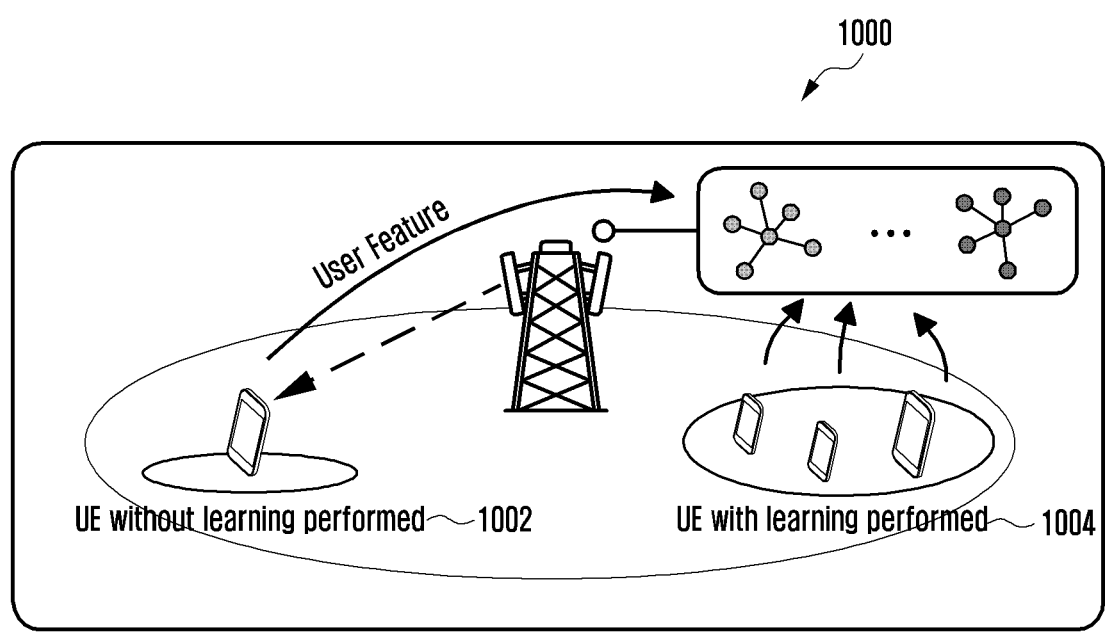
FIG. 10 is a diagram schematically illustrating a scheme of performing a data transmission phase between a base station and a terminal that has not performed a learning phase, according to an embodiment.

FIG. 10 is a diagram 1000 schematically illustrating a scheme of performing a data transmission phase between a base station and a terminal that has not performed a learning phase, according to an embodiment.

Referring to FIG. 10, the base station may store user features and constellation sets received from terminals 1004 that have performed the learning phase described in the first embodiment described above. By using them and selecting a constellation set suitable for a user feature of a terminal 1002 that has not performed the learning phase, the base station may support the data transmission phase even in the terminal 1002.

Figure 11:
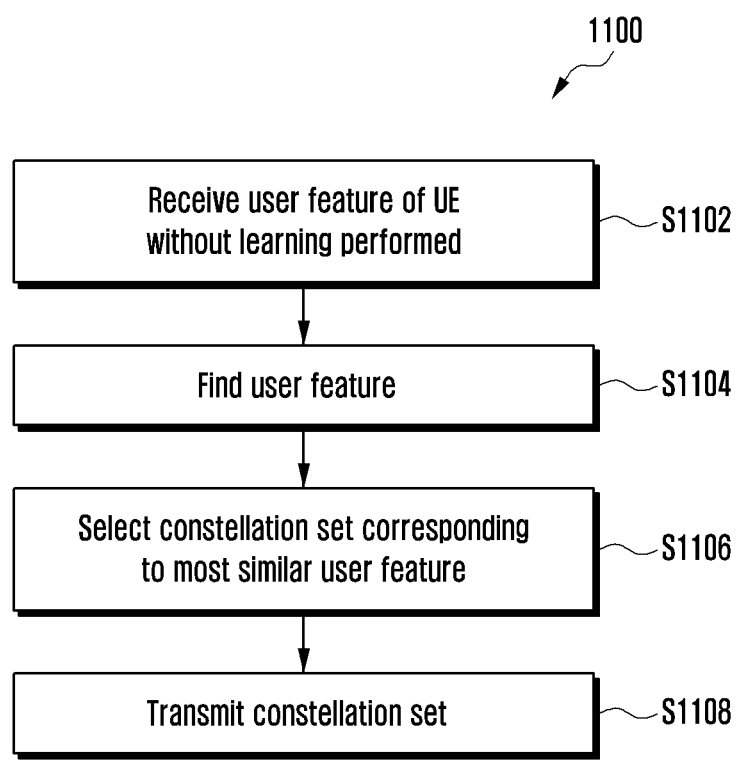
FIG. 11 is a flowchart illustrating operations of a base station for supporting a data transmission phase to a terminal that has not performed a learning phase, according to an embodiment.

FIG. 11 is a flowchart 1100 illustrating operations of a base station for supporting a data transmission phase to a terminal that has not performed a learning phase, according to an embodiment.

At step S1102, the base station may receive a user feature of a terminal from the terminal that has not performed the learning phase. The user feature is a user-specific parameter that may affect a channel or channel distribution on which the constellation design is based. For example, the user feature may include a terminal position, a mobility, a line of sight (LOS) condition, an RCV set, and the like. It is assumed that the base station receives and stores user features and constellation sets from one or more other terminals having performed the learning phase. At step S1104, among the user features received from the terminals having performed the learning phase, the base station may search for a user feature most similar to the user feature received from the terminal having not performed the learning phase. Then, the base station may select a constellation set corresponding to the found user feature at step S1106, and transmit the selected constellation set to the terminal having not performed the learning phase at step S1108. Thereafter, the terminal and the base station may perform communication based on the data transmission phase described in the second embodiment.

Figure 12:
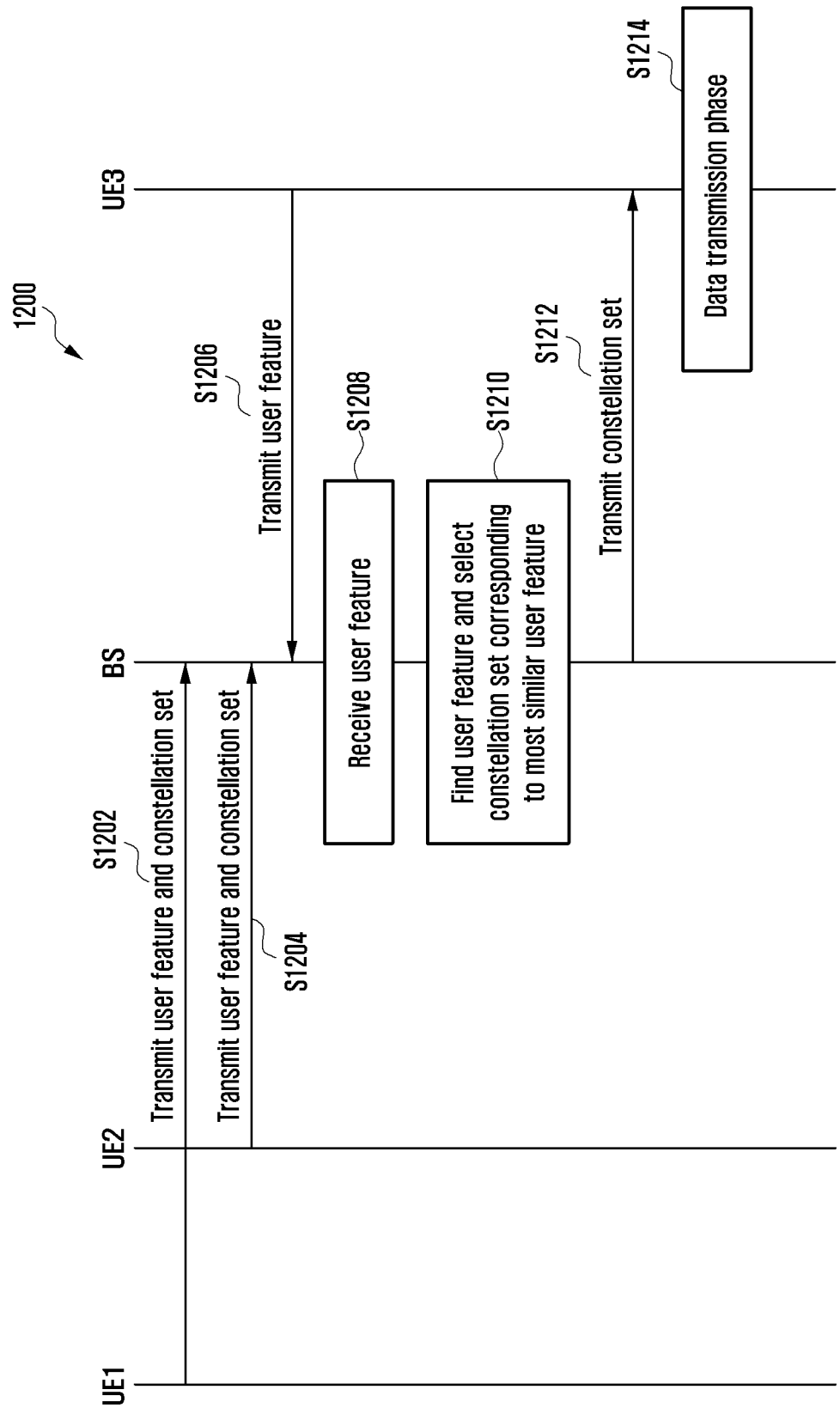
FIG. 12 is a flow diagram illustrating operations of a terminal and a base station for supporting a data transmission phase to a terminal that has not performed a learning phase, according to an embodiment.

FIG. 12 is a flow diagram 1200 illustrating operations of a terminal and a base station for supporting a data transmission phase to a terminal that has not performed a learning phase, according to an embodiment.

Referring to FIG. 12, at operations S1202 and S1204 the base station (BS) may receive user features and constellation sets from a first terminal (UE1) and a second terminal (UE2) that have performed the learning phase, and may store them. Although FIG. 12 shows two terminals (UE1, UE2) having performed the learning phase, this is only an example. Alternatively, user features and constellation sets may be received from one, two, three or more terminals having performed the learning phase. Meanwhile, a third terminal (UE3) that has not performed the learning phase may transmit its user feature to the base station at operation S1206, and the base station may receive it at operation S1208. Upon receiving the user feature from the third terminal (UE3), at operation S1210 the base station may search for user features received from terminals, including the first terminal (UE1) and the second terminal (UE2), having performed the learning phase and, based on the search result, select a constellation set corresponding to the user feature that is most similar to that of the third terminal (UE3). Then, the base station may transmit the selected constellation set to the third terminal (UE3) at operation S1212, and thereafter the third terminal (UE3) and the base station may perform communication based on the data transmission phase as described above in the second embodiment.

Figure 13:
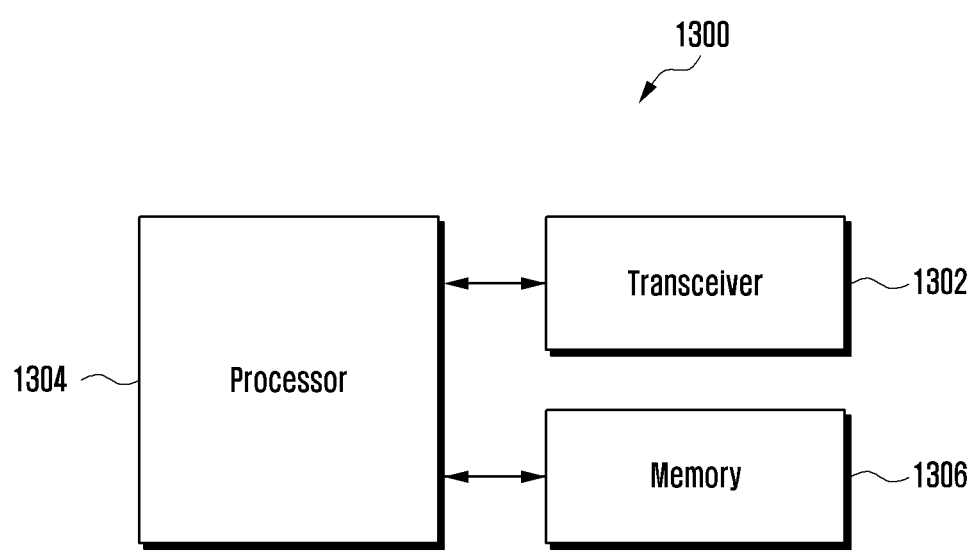
FIG. 13 is a block diagram illustrating a structure of a terminal, according to an embodiment.

FIG. 13 is a block diagram 1300 illustrating a structure of a terminal, according to an embodiment.

Referring to FIG. 13, the terminal (UE) may include a transceiver 1302, a memory 1306, and a processor (or controller) 1304. Components of the terminal are not limited to the above. Alternatively, the terminal may include more or fewer components than the above-listed components. In addition, at least some or all of the transceiver 1302, the memory 1306, and the processor 1304 may be implemented in the form of a single chip.

In an embodiment, the transceiver 1302 may transmit and receive signals to and from a base station or another terminal. These signals may include control information and data. To this end, the transceiver 1302 may include an RF transmitter that up-converts and amplifies a frequency of a signal to be transmitted, and an RF receiver that amplifies a received signal with low noise and down-converts a frequency of the received signal. In addition, the transceiver 1302 may receive a signal through a radio channel and output the received signal to the processor 1304. Also, the transceiver 1302 may transmit a signal outputted from the processor 1304 through a radio channel.

The memory 1306 may store programs and data necessary for the operation of the terminal. In addition, the memory 1306 may store control information or data included in signals transmitted and received by the terminal. The memory 1306 may be formed of a storage medium such as a ROM, a RAM, a hard disk, a CD-ROM, or a DVD, or a combination of storage media. Also, the memory 1306 may be formed of a plurality of memories.

The processor 1304 may control a series of processes in which the terminal operates according to the above-described embodiments. The processor 1304 may execute a program stored in the memory 1306 and thereby control the terminal to perform the operations of the terminal according to the above-described embodiments including the learning phase and the data transmission phase.

Figure 14:
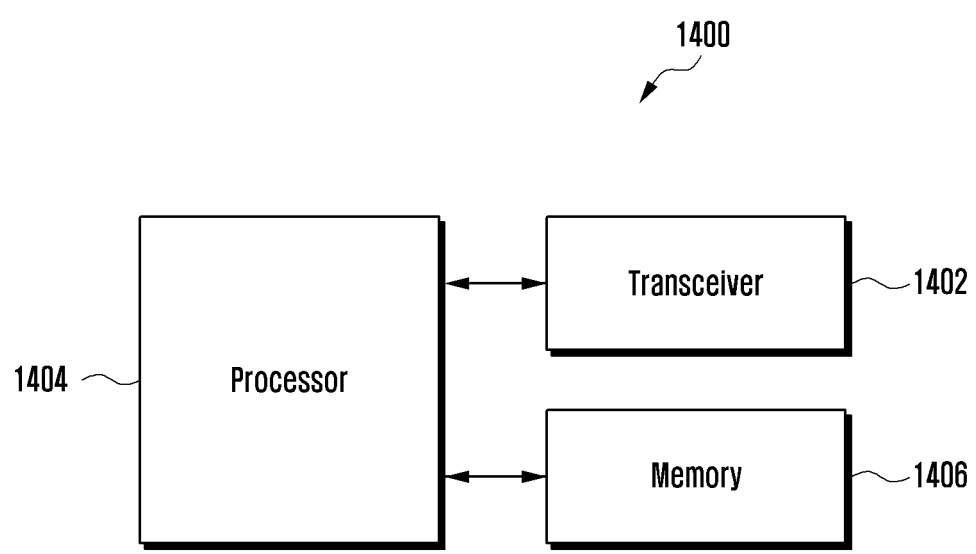
FIG. 14 is a block diagram illustrating a structure of a base station, according to an embodiment.

FIG. 14 is a block diagram 1400 illustrating a structure of a base station, according to an embodiment.

Referring to FIG. 14, the base station may include a transceiver 1402, a memory 1406, and a processor (or controller) 1404, Components of the base station are not limited to the above. Alternatively, the base station may include more or fewer components than the above-listed components. In addition, at least some or all of the transceiver 1402, the memory 1406, and the processor 1404 may be implemented in the form of a single chip.

The transceiver 1402 may transmit and receive signals to and from terminals. These signals may include control information and data. To this end, the transceiver 1402 may include an RF transmitter that up-converts and amplifies a frequency of a signal to be transmitted, and an RF receiver that amplifies a received signal with low noise and down-converts a frequency of the received signal. In addition, the transceiver 1402 may receive a signal through a radio channel and output the received signal to the processor 1404. Also, the transceiver 1402 may transmit a signal outputted from the processor 1404 through a radio channel.

The memory 1406 may store programs and data necessary for the operation of the base station. In addition, the memory 1406 may store control information or data included in signals transmitted and received by the base station. The memory 1406 may be formed of a storage medium such as a ROM, a RAM, a hard disk, a CD-ROM, or a DVD, or a combination of storage media. Also, the memory 1406 may be formed of a plurality of memories.

The processor 1404 may control a series of processes in which the base station operates according to the above-described embodiments. The processor 1404 may execute a program stored in the memory 1406 and thereby control the base station to perform the operations of the base station according to the above-described embodiments including the learning phase and the data transmission phase.

Methods according to claims or embodiments described herein may be implemented by hardware or a combination of hardware and software.

When implemented using software, a computer-readable storage medium for storing one or more programs (software modules) may be provided as hardware. One or more programs stored on the computer-readable storage medium are configured for execution by one or more processors in an electronic device. The one or more programs include instructions that cause the electronic device to perform the methods according to claims or embodiments described herein.

Such programs (software module, software) may be stored in a random access memory, a non-volatile memory including a flash memory, a read only memory (ROM), an electrically erasable programmable ROM (EEPROM), a magnetic disc storage device, a compact disc ROM, digital versatile discs (DVDs) or other optical storage devices, and a magnetic cassette. Alternatively, the programs may be stored in a memory combining part or all of those recording media. A plurality of memories may be provided.

The programs may be stored in an attachable storage device accessible via a communication network formed of Internet, Intranet, local area network (LAN), wide area network (WAN), or storage area network (SAN), alone or in combination. This storage device may access an apparatus performing embodiments of the disclosure through an external port. In addition, a separate storage device in the communication network may access an apparatus performing embodiments of the disclosure.

In the above-described embodiments, components or elements have been expressed as a singular or plural form. It should be understood, however, that such singular or plural representations are selected appropriately according to situations presented for the convenience of description, and the disclosure is not limited to the singular or plural form. Even expressed in a singular form, a component or element may be construed as a plurality of components or elements, and vice versa.

While the disclosure has been particularly shown and described with reference to exemplary embodiments thereof, it will be understood by those skilled in the art that various changes in form and details may be made therein without departing from the scope of the subject matter as defined by the appended claims.

What is claimed is:

1. A method of a first terminal in a wireless communication system, the method comprising:
    performing channel measurement, based on one or more first reference signals received from a base station;
    identifying channel distribution information between the first terminal and the base station, based on the measured channel;
    determining representative channel vectors (RCV) set including one or more RCVs, based on the identified channel distribution information;
    generating one or more constellations corresponding to the selected one or more RCVs;
    transmitting, to the base station, information on a constellation set including the one or more constellations;
    determining a constellation corresponding to an RCV having a smallest distance with a channel vector obtained based on a second reference signal;
    transmitting, to the base station, a constellation index (CI) indicating the determined constellation; and
    performing communication with the base station, based on the constellation corresponding to the RCV.

2. The method of claim 1, wherein the one or more constellations are generated such that a minimum value of a distance between two symbols included in the constellation is maximized.

3. The method of claim 1, further comprising:
    transmitting user feature information related to the channel distribution information to the base station.

4. The method of claim 3, wherein the user feature information includes at least one of a terminal position, a mobility, a line of sight (LOS) condition, and an RCV set.

5. The method of claim 1, further comprising:
    performing channel measurement based on the second reference signal received from the base station;
    mapping a channel measured based on the second reference signal to the RCV set; and
    selecting the constellation to be used for communication, based on a mapping result.

6. The method of claim 5, wherein mapping to the RCV set comprises:
    calculating a distance between the channel vector measured based on the second reference signal and each of the one or more RCVs of the RCV set;
    determining whether RCV mapping is appropriate, based on whether there is an RCV having a distance less than or equal to a predetermined value;
    selecting the constellation corresponding to the RCV having a smallest distance with a channel vector obtained based on the second reference signal, in response to the RCV mapping being determined to be appropriate.

7. The method of claim 1, further comprising:
    determining whether the constellation set information is valid;
    upon determination that the constellation set information is not valid, regenerating one or more constellations, based on one or more third reference signals received from the base station;
    transmitting constellation set information including the regenerated one or more constellations to the base station; and
    performing communication with the base station, based on the regenerated one or more constellations.

8. The method of claim 1, further comprising:
    determining whether the constellation set information is valid;
    upon determination that the constellation set information is not valid, receiving corrected constellation set information from the base station; and
    performing communication with the base station, based on the corrected constellation set information.

9. A method of a second terminal in a wireless communication system, the method comprising:
    performing channel measurement, based on one or more first reference signals received from a base station;
    identifying channel distribution information between the second terminal and the base station, based on the measured channel;
    transmitting user feature information related to the channel distribution information to the base station;
    receiving, from the base station, one or more constellations determined based on the user feature information; and
    performing communication with the base station, based on the received one or more constellations,
    wherein the one or more constellations corresponds to a constellation set generated by a first terminal, and a similarity in user feature information between the first terminal and the second terminal satisfies a predetermined condition.

10. The method of claim 9, wherein the user feature information includes at least one of a terminal position, a mobility, a line of sight (LOS) condition, and an RCV set.

11. A method of a base station in a wireless communication system, the method comprising:
    receiving, from a first terminal, information on a constellation set including one or more constellations;
    transmitting a reference signal for channel measurement to the first terminal;
    receiving a constellation index (CI) indicating a constellation corresponding to a representative channel vector (RCV) having a smallest distance with a channel vector obtained based on the reference signal;
    determining the constellation indicated by the CI; and
    performing communication with the first terminal, based on the determined constellation.

12. The method of claim 11, wherein the one or more constellations are generated such that a minimum value of a distance between two symbols included in the constellation is maximized.

13. The method of claim 11, further comprising:
receiving first user feature information from the first terminal;
receiving second user feature information from a second terminal; and
when a similarity between the first user feature information and the second user feature information satisfies a predetermined condition, transmitting the constellation set information received from the first terminal to the second terminal.

14. The method of claim 13, wherein each of the first user feature information and the second user feature information includes at least one of a terminal position, a mobility, a line of sight (LOS) condition, and an RCV set.

15. A first terminal in a wireless communication system, comprising:
a transceiver; and
a controller configured to:
perform channel measurement, based on one or more first reference signals received from a base station,
identify channel distribution information between the first terminal and the base station, based on the measured channel,
determine representative channel vectors (RCV) set including one or more RCVs, based on the identified channel distribution information,
generate one or more constellations corresponding to the selected one or more RCVs,
transmit, to the base station, information on a constellation set including the one or more constellations,
determine a constellation corresponding to an RCV having a smallest distance with a channel vector obtained based on the second reference signal;
transmit, to the base station, a constellation index (CI) indicating the determined constellation; and
perform communication with the base station, based on the constellation corresponding to the RCV.

16. A second terminal in a wireless communication system, comprising:
a transceiver; and
a controller configured to:
perform channel measurement, based on one or more first reference signals received from a base station,
identify channel distribution information between the second terminal and the base station, based on the measured channel,
transmit user feature information related to the channel distribution information to the base station,
receive, from the base station, one or more constellations determined based on the user feature information, and
perform communication with the base station, based on the received one or more constellations,
wherein the one or more constellations correspond to a constellation set generated by a first terminal, and a similarity in user feature information between the first terminal and the second terminal satisfies a predetermined condition.

17. A base station in a wireless communication system, comprising:
a transceiver; and
a controller configured to:
receive, from a first terminal, information on a constellation set including one or more constellations,
transmit a reference signal for channel measurement to the first terminal,
receive a constellation index (CI) indicating a constellation corresponding to a representative channel vector (RCV) having a smallest distance with a channel vector obtained based on the reference signal,
determine the constellation indicated by the CI, and
perform communication with the first terminal, based on the determined constellation.

* * * * *